United States Patent
Rodenbach et al.

[11] 3,807,754
[45] Apr. 30, 1974

[54] PASSIVE RESTRAINT SYSTEMS FOR VEHICLE OCCUPANTS

[75] Inventors: Charles B. Rodenbach; Fredric L. Schrock, both of South Bend, Ind.; James R. Zimmerman, Pontiac, Mich.

[73] Assignee: Uniroyal, Inc., New York, N.Y.

[22] Filed: Jan. 3, 1972

[21] Appl. No.: 214,947

[52] U.S. Cl. ............ 280/150 AB, 139/389, 117/44, 161/170
[51] Int. Cl. ............................................. B60n 21/08
[58] Field of Search .......... 280/150 AB; 117/44, 11; 161/170; 138/145; 139/389

[56] References Cited
UNITED STATES PATENTS

| | | | |
|---|---|---|---|
| 3,243,822 | 4/1966 | Lipkin ......................... | 280/150 AB |
| 3,649,045 | 3/1972 | Smith et al. .................. | 280/150 AB |
| 3,511,519 | 5/1970 | Martin ......................... | 280/150 AB |
| 2,974,912 | 3/1961 | Namsick ....................... | 244/138 R |
| 3,481,625 | 12/1969 | Chute .......................... | 280/150 AB |
| 2,798,820 | 7/1957 | Nelson .......................... | 117/44 X |
| 2,066,639 | 1/1937 | Masland ......................... | 117/44 X |
| 2,400,990 | 5/1946 | Hawley, Jr. ..................... | 117/38 |
| 2,834,606 | 5/1958 | Bertrand ....................... | 280/150 AB |
| 2,020,300 | 11/1935 | Cundall ......................... | 117/44 |

*Primary Examiner*—David Schonberg
*Assistant Examiner*—John P. Silverstrim
*Attorney, Agent, or Firm*—Robert J. Patterson, Esq.

[57] ABSTRACT

Safety apparatus for protecting an occupant of a vehicle during an accident comprising a confinement inflatable from a collapsed condition to an expanded condition in which the confinement is adapted to restrain movement of the occupant relative to the vehicle during an accident, and means for effecting expansion of the confinement to the expanded condition by introducing a gas under pressure, typically compressed air, from a source outside the confinement into the confinement. The wall of the confinement is formed from one or several continuous uninterrupted seamless sections of fabric, usually woven fabric. A portion of the area of the section or sections has a continuous substantially air-impermeable coating layer applied thereto. The remaining portion of the area of the section or sections is uncoated and has substantially the air permeability of the uncoated fabric. The desired speed of deflation of the confinement following inflation thereof when collision takes place is easily controlled by adjusting the proportion of coated and uncoated areas of the confinement. There are no seams between the uncoated and coated areas because the juncture of the uncoated fabric and the coated fabric is not a seam but a continuation of the fabric itself.

4 Claims, 7 Drawing Figures

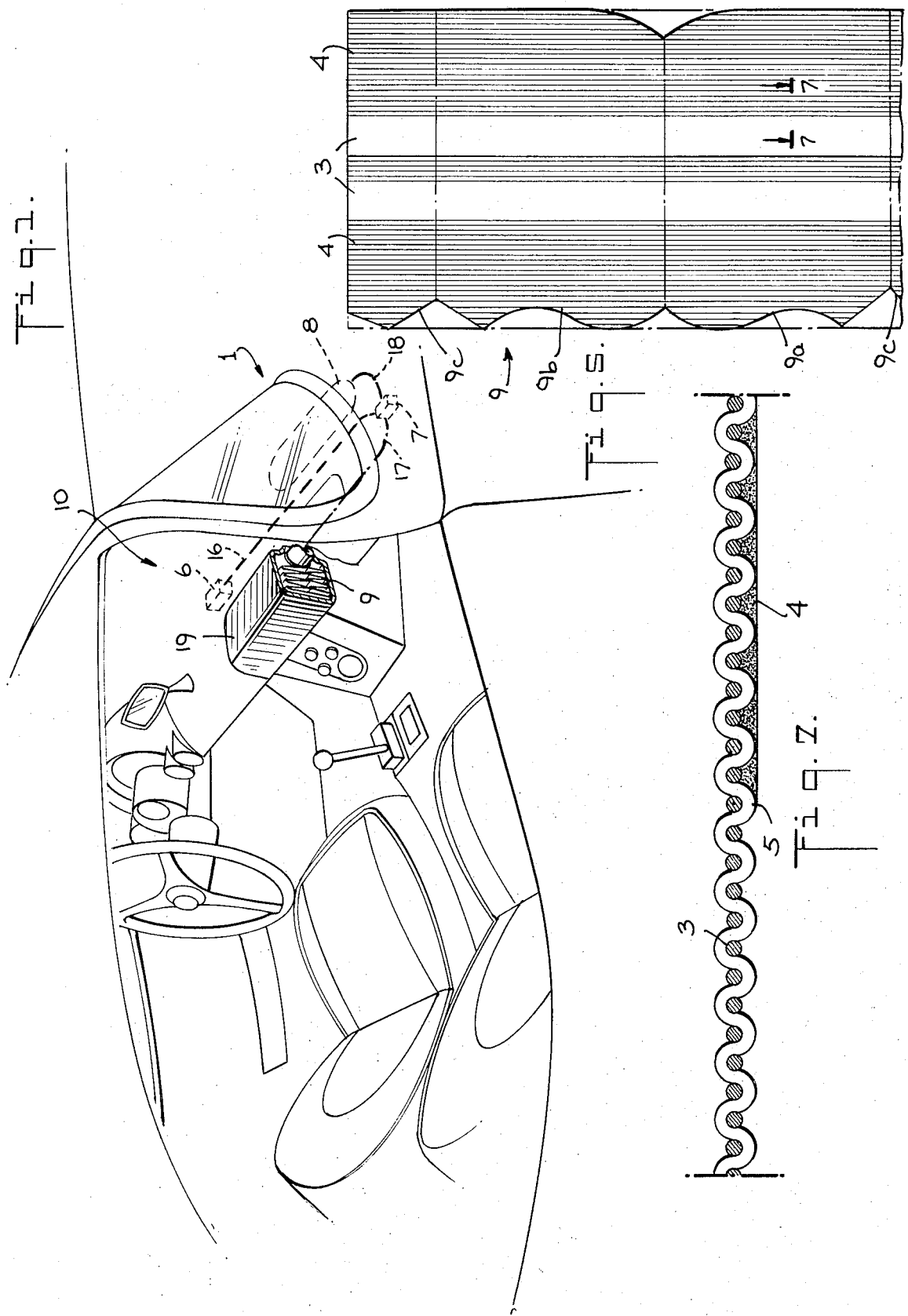

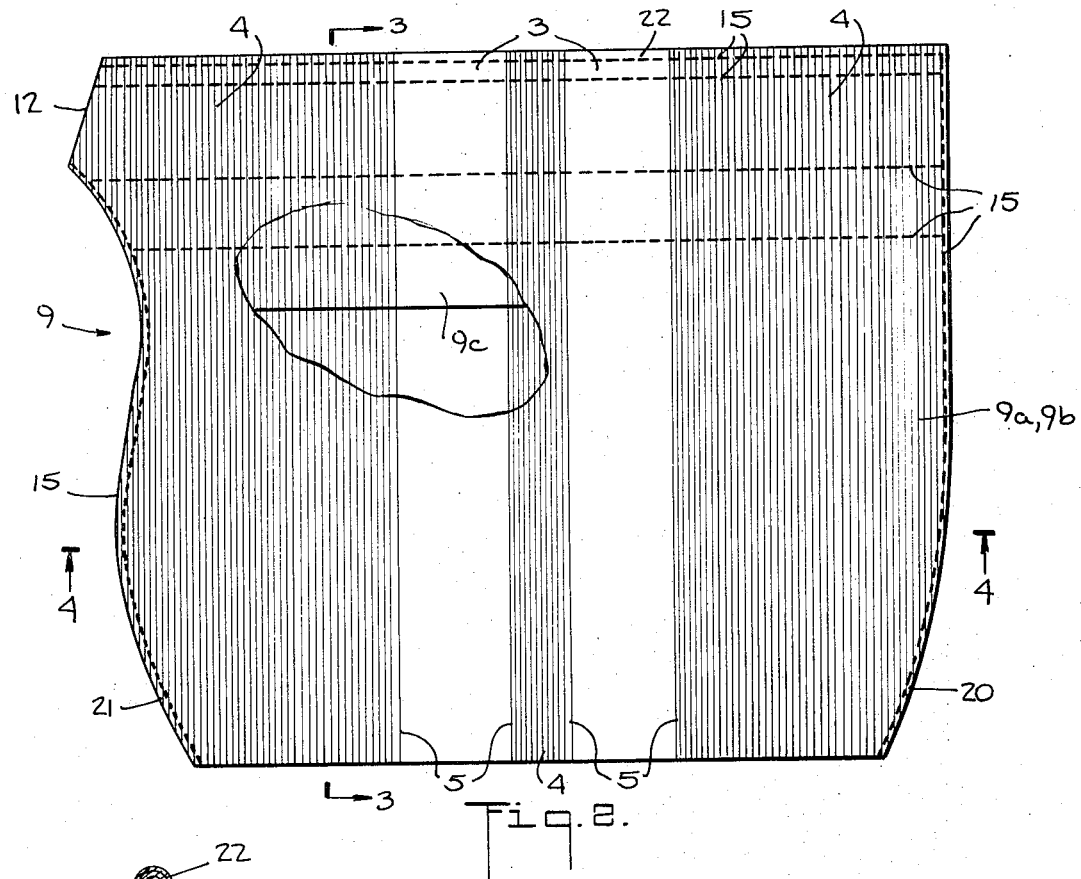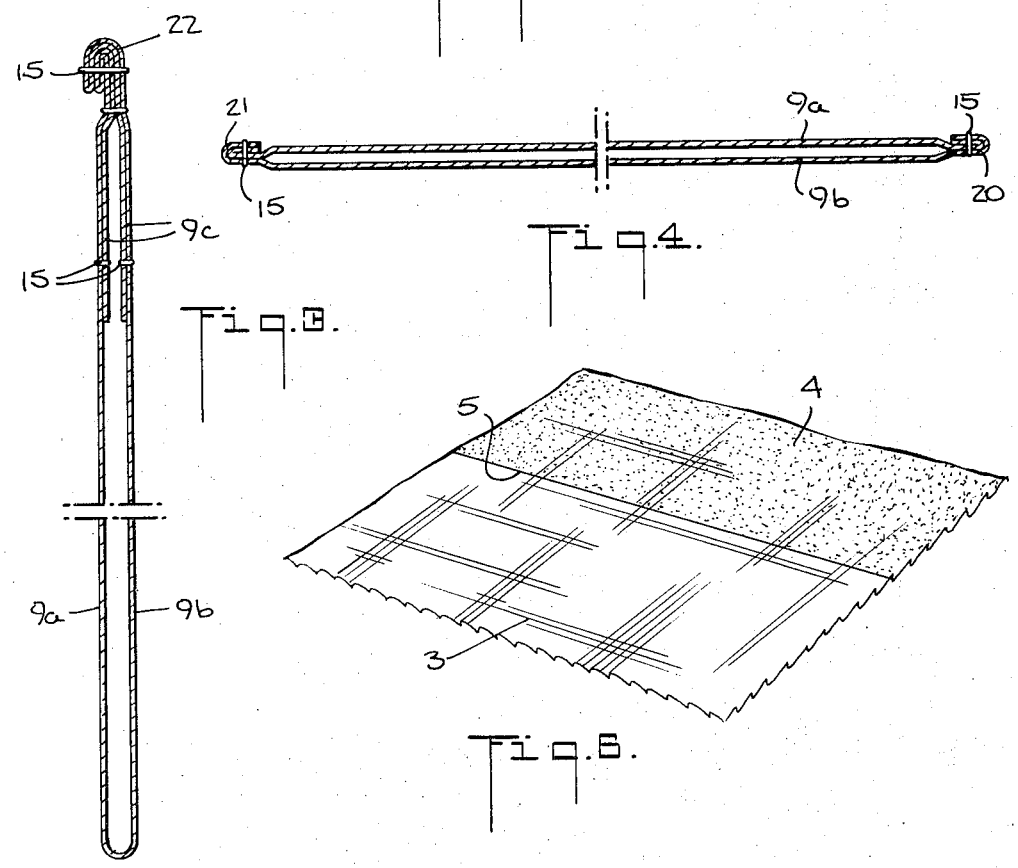

PASSIVE RESTRAINT SYSTEMS FOR VEHICLE OCCUPANTS

BACKGROUND OF THE INVENTION

1. Field of the Invention

The field of the invention is passive restraint systems for vehicles, especially motor vehicles, which depend for their efficacy upon so-called confinements, i.e. flexible containers often referred to as "air bags," which are normally in the collapsed condition but which are expanded so as to perform their passenger restraining functions by the substantially instantaneous introduction of a fluid, generally compressed air, pyrotechnic generated gas or a combination thereof, as a result of activation brought about in suitable manner when a collision occurs.

2. Description of the Prior Art

It has been recognized for some time that it is advantageous in passenger restraint systems which employ so-called confinements or air bags to deflate such bags at a suitable interval after they have been expanded into operative position. Thus Bertrand in U.S. Pat. Nos. 2,834,606 (1958) and 2,834,609 (1958) shows means for automatically operating bag deflating means after a predetermined period of time has elapsed following inflation of the bag. Others have suggested that the bags be provided in their wall with blow-outs or rupturable patches or small plugs which blow off at a suitable point in pressure build up and allow deflation; see for example: U.S. Pat. to Carey No. 3,451,693 (1969), and Brawn et al. U.S. Pat. No. 3,573,885 (1971). U.S. Pat. No. to Martin 3,511,519 (1970) shows a somewhat different approach. These patents seek to eliminate or minimize dangerous rebound of the occupant when coming into engagement with the confinement by using a confinement having at least a portion thereof made of a porous material. This provides fluid exhaust openings for continuously allowing fluid to be exhausted therefrom as the confinement is expanded, and as the bag is compressed by the passengers as they move into the bag.

In the earlier work on vehicle passive restraint systems using inflatable bags, the bags were made from polymer-coated fabrics and were completely free of uncoated areas. Thus, when the bag was inflated it tended to stay inflated and continued to occupy the space between the occupants and the structural components of the vehicle. Studies made on such bags indicated that the bag performance, in a total concept approach, was improved substantially if certain portions of the bag were made of uncoated fabric thereby allowing the air that was used to "inflate" the bag, to escape, thereby allowing controlled deflation of the bag. The net effect is a softer, higher energy absorbing confinement which greatly reduces rebound when a vehicle occupant engages the confinement during a collision. Bags embodying an uncoated portion or portions of fabric and polymer-coated portions have been made by a "cut and sew" method and used experimentally. That is, the earlier air bags, which were made in toto from polymer-coated fabrics, and therefore were impermeable, were modified by cutting out certain sections of the polymer-coated fabric and replacing those sections with uncoated fabric. The position and size of the uncoated portions in the total bag were determined empirically. The uncoated fabric portions were mechanically sewn, by stitching, to the adjacent edges of the polymer-coated fabric portions. This resulted in a seam with substantial bulk (at least as thick as the layer of fabric and the layer of polymer-coated fabric combined) and resulted in a seam whose strength was determined by the strength of the stitching cord used. Actually the overall strength of the fabric in the seam was reduced by the perforating effect of the stitching. Another factor militating against the use of stitching is its cost.

In an alternative method of positioning and holding the uncoated fabric areas in the air bag, dielectric or hot die sealing methods replaced the mechanical stitch and sew technique. However, such systems did not materially reduce the bulkiness of the seam, nor did the seam have a strength as great as either the polymer-coated fabric or the uncoated fabric. In addition, the cost of providing seaming was not appreciably reduced by this technique. For additional prior art background, see the article, "Materials, Fabrication, and Packs for Air Cushions" by Streed and Rodenbach, presented at the Jan. 1971 Automotive Engineering Congress at Detroit, Michigan.

U.S. Pat. Nos. to Tillotson 2,060,961 (1936), Hyatt et al. 2,204,859 (1940), Hawley 2,400,990 (1946) and Nelson 2,798,820 (1957) show fabrics and fabric articles in which the fabric is partly coated with an air-impervious coating material and partly uncoated. However, none of these patents remotely teaches or suggests making an inflatable confinement from fabric which is partly coated and partly uncoated.

SUMMARY OF THE INVENTION

The invention resides in safety apparatus for protecting an occupant of a vehicle during a collision, the apparatus comprising a confinement inflatable from a collapsed condition to an expanded condition in which the confinement is designed to control the movement of the occupant relative to the vehicle during a collision, and conventional means for effecting expansion of the confinement to the expanded condition, when a collision occurs, by introducing a gas under pressure, typically and most conveniently compressed air, from a source outside the confinement into the confinement. The invention resides particularly in the construction of the confinement. In accordance with the invention, the confinement is fabricated from at least one, and usually two or more, continuous uninterrupted seamless sections of fabric, preferably woven fabric, which when uncoated is highly permeable to air, a portion or portions of such section having a continuous substantially air-impermeable coating layer applied thereto, and the remaining portion or portions of such section being uncoated and having substantially the air permeability of the uncoated fabric.

By the use in the wall of the confinement of a section or sections of uninterrupted fabric which is partly uncoated and partly coated, the present invention overcomes the complexities, and deficiencies of methods used by earlier workers in the art, which involved cutting out certain sections of the polymer-coated fabric and replacing such sections with uncoated fabric mechanically sewn to the adjacent edges of the polymer-coated fabric portions. In particular the present invention provides a simple and economical way of imparting to the confinement, when expanded, the desired "ride down" to reduce rebound injury and the desired rapidity of deflation after inflation is discontinued. The invention achieves these results without the added costs of sewn seams or dielectrically sealed seams, with their attendant high labor cost and inconvenience of manufacture, bulk, and inherently low strength compared to uninterrupted or seamless fabric.

BRIEF DESCRIPTION OF THE DRAWING

FIG. 1 is a schematic in situ view of a motor vehicle equipped with an air bag passive restraint system in which an air bag of the present invention can be used;

FIG. 2 is a plan view, partially cut away, of the confinement of this invention shown in the uninflated, unfolded state;

FIG. 3 is a sectional view, taken on the line 3—3, of the confinement of FIG. 2;

FIG. 4 is a sectional view taken on line 4—4, of the confinement of FIG. 2;

FIG. 5 is a plan view of the fabric pattern used in making the confinement of FIG. 2;

FIG. 6 is an isometric view of a portion of the fabric pattern of FIG. 5; and

FIG. 7 is a sectional view taken on the line 7—7 of FIG. 5.

Generally speaking, the invention is for a safety apparatus for protecting an occupant of a vehicle during a collision, with one of the novel features of the invention being a partially coated confinement.

The confinement is of the variety that inflates with the introduction of a fluid from a collapsed condition to an expanded condition, when a collision of the vehicle occurs. It is adapted to control the movement of the occupant relative to said vehicle.

The confinement comprises walls formed from at least one continuous substantially uninterrupted seamless section of fabric having at least one uncoated fluid-permeable portion and at least one portion which has a coating layer applied thereto that is substantially fluid-impermeable.

Now referring to FIG. 1, a schematic in situ view of the safety apparatus of this invention is shown.

The front seat compartment of a motor vehicle is generally represented by arrow 10. A compartment 19 on the dash of the compartment contains a confinement or bag 9 in folded, uninflated condition.

In the event of a crash, the sensor 6 is activated. Typically the sensor is mounted on the firewall of the vehicle generally depicted in the area shown by arrow 1. Sensor 6 is connected to a valve 7 through connection 16. When activated, sensor 6 sends a signal, or otherwise causes valve 7 to open. A container 8 of fluid, an explosive charge, a rapidly burning powder generating a large volume of gas quickly, and/or gas under pressure is also situated in the immediate area of the firewall, and is connected to valve 7 by means of conduit 18. Container 8 is made to release its fluid through open valve 7 during the crash. The fluid is transported by means of conduit 17 into confinement 9 causing it to inflate and be released from compartment 19. A passenger seated in compartment 10 will move into engagement with the expanded confinement 9 and be controlled relative to the vehicle, so as to avoid injury.

The confinement is designed so that after the fluid is discontinued or otherwise no longer produces adequate inflation pressure, the confinement will deflate. Actually, sections of bag 9 are made of porous material, so that deflation of the bag is taking place even while it is expanding.

FIG. 2 illustrates the confinement 9 in the unfolded, uninflated condition. Fluid under pressure (greater than that already in the confinement) is introduced at inlet 12. The bag may be made from a porous nylon fabric or cotton and polyester fabrics or blends of nylon/cotton/polyester or any combination thereof, rip-stop or square woven, denoted by designation 3. Although other materials and weavings can be employed in the practice of this invention, the aforementioned constructions are preferred. Nylon, cottons, and polyesters are strong and do not provide an abrasive surface with which an occupant will come into contact. The confinement of the invention is strip coated with a layer of fluid-impermeable material 4 such as rubber. The fabric 3 is continuous and uninterrupted throughout both the uncoated and coated portions thereof. The coating layers 4 preferably are on the inside of the bag 9. The demarcation line 5 between uncoated and coated portions (FIGS. 2, 6, and 7) contains no stitching or seams, because the base fabric 3 is uninterrupted and continuous. Stitching is undesirable since it weakens the fabric.

It will be understood that the closely spaced lines in FIG. 2 indicate the zones or areas of the coatings and that the coatings themselves are preferably on the interior of the bag as indicated above.

Stitching may also provide a protrusive surface that will abrade the occupant upon contact therewith. Also stitching is usually more costly than other seaming or sealing methods.

The confinement of the present invention typically has several coated areas comprising impervious coating layers 4 on fabric 3. The cut fabric pattern used in making the confinement 9 of FIGS. 2, 3 and 4 is illustrated in FIG. 5, depicting three sections, 9a, 9b and 9c, respectively. Sections 9a, and 9b form the upper and lower walls of the bag as shown in FIGS. 3 and 4. Section 9c overlaps the inlet end portion of walls 9a and 9b to provide extra strength in this area. The inlet section 12 of the confinement is made stronger because it is subject to additional kinetic stress resulting from its receiving the initial surge of incoming fluid, and the resulting force applied upon deflation.

The confinement is sealed about its periphery, and at its overlap sections by vulcanized or sewn seams 15. Heat sealing may also be used, however. The bag fabric is doubled over at its margins as indicated by reference numerals 20, 21, and 22 (FIGS. 2-4) for added strength in these areas.

The coating 4 can be made from neoprene which has a good shelf life and is free from a tendency to become brittle with age or temperature extremes. Of course, however, other materials such as urethanes, PVC, butyls, EPDM, or combinations of these, may be used in certain applications. Such materials help preserve the fabric, especially where pyrotechnic inflation is employed, and render the coated or portions of the fabric air-impermeable.

In choosing the base fabric 3, consideration must be given to various physical and chemical properties such as: tensile strength; tear strength; elongation; resistance to aging; heat degradation; moisture degradation; mildew potential; and flammability. Also, the weight or density of the various materials is important from the standpoint of handling and performance. Retention of these properties and flexibility plays a role when the bag is folded for long periods of time.

The confinement of the invention disclosed herein may be designed for many different applications, such as aircraft, water or rail travel, automobiles, rockets, etc. Each application will require a modification of the design and materials discussed, so that the description and the drawings are intended to be merely exemplary of the invention. The scope of the invention should be interpreted in accordance with the appended claims.

Having thus described our invention, what we claim and desire to protect by Letters Patent is:

1. A flexible confinement adapted to protect an occupant of a vehicle during a collision, said confinement being inflatable from a folded collapsed condition to an expanded condition in which it is adapted to control movement of the occupant relative to the vehicle during a collision, said confinement having its wall formed from a continuous seamless section of woven fabric folded back on itself so as to extend from the inflating end of the confinement to the opposite end thereof and then back to the inflating end, the sides of said section and the adjacent ends at the inflating end being fluid tightly seamed together, the inside face of said section being longitudinally strip-coated with spaced strips of a continuous, fluid-impermeable coating which extends completely around said confinement, the areas of said fabric between said spaced strips, which areas also extend completely around said confinement, being uncoated and having the fluid permeability of the uncoated fabric, the relative areas of the strip-coated portions and the uncoated portions of the wall of the confinement being such as to allow instantaneous controlled expansion of the confinement and deflation thereof during and after inflation.

2. A confinement as defined claim 1 including the further feature of having additional portions of the strip-coated and uncoated fabric overlapping the wall in the areas adjacent to the inflating end on each inside face thereof to provide additional strength in said areas.

3. A safety apparatus for protecting an occupant of a vehicle during a collision, said safety apparatus comprising a flexible confinement inflatable from a folded collapsed condition to an expanded condition in which said confinement is adapted to control movement of the occupant relative to the vehicle during a collision, said confinement having its wall formed from a continuous seamless section of woven fabric folded back on itself so as to extend from the inflating end of the confinement to the opposite end thereof and then back to the inflating end, the sides of said section and the adjacent ends at the inflating end being fluid tightly seamed together, the inside face of said section being longitudinally strip-coated with spaced strips of a continuous, fluid-impermeable coating which extends completely around the confinement, the areas of said fabric between said spaced strips, which areas also extend completely around said confinement, being uncoated and having the fluid permeability of the uncoated fabric, the relative areas of the strip-coated portions and the uncoated portions of the wall of the confinement being such as to allow instantaneous controlled expansion of the confinement and deflation thereof during and after inflation, and means connected to the inflating end of said confinement for effecting expansion of the confinement from the folded collapsed condition to the expanded condition, when a collision occurs, by introducing a gas under pressure from a source outside the confinement into the inflating end thereof.

4. Safety apparatus as defined in claim 3 including the further feature of having additional portions of the strip-coated and uncoated fabric over-lapping the wall in the areas adjacent to the inflating end of each inside face thereof to provide additional strength in said areas.

* * * * *